Patented Aug. 18, 1931

1,819,165

UNITED STATES PATENT OFFICE

HENRY BOHN HASS, OF CHARLESTON, WEST VIRGINIA, ASSIGNOR TO GASOLINE RECOVERY CORPORATION, A CORPORATION OF DELAWARE

HIGHLY ACTIVE CARBON AND ITS MANUFACTURE

No Drawing.   Application filed May 28, 1927.  Serial No. 195,137.

This invention relates to a new process for the manufacture of highly active carbon suitable primarily for the sorption of gases and vapors and to the novel product resulting therefrom.

The process most widely used at present for the manufacture of highly active gas adsorbent carbon consists in charring carbonaceous material such as coconut shells by the application of heat and the further treatment of the "primary carbon" so produced with mild oxidizing agents such as superheated steam, which slowly oxidize the "primary carbon". The sorptive activity of the carbon per unit volume increases up to a certain point, after which it decreases. This point of maximum activity varies with the raw material used and the details of the procedure but usually corresponds to a yield of about 5–10% by weight of the original carbonaceous material.

If a typical primary carbon, such as is formed by charring coconut shells, is examined under the microscope, it is at once seen that much of the original cell structure of the shell still remains in the charcoal. A large number of gross pores exist which are too large to be useful for taking up gases or vapors. It is evident that oxidation, which serves to increase the size of the pores, cannot make these large pores useful for absorbing gases or vapors. Any primary carbon which possesses an appreciable amount of gross pores contains that amount of waste volume which makes it impossible for the carbon ever to show the maximum activity per unit grain volume which would be possible if the gross pores did not exist.

It is largely for this reason that very dense materials such as coconut shells, produce, when charred, a primary carbon which can be brought to a higher activity than wood charcoal and, as a rule, charcoals from heavy woods show a higher maximum activity than those from light woods. The coconut "primary carbon" contains a smaller volume of gross pores than the wood charcoal.

Even a relatively dense charcoal such as produced from coconut shells contains a great deal of waste space which can be determined in the following way: A granule of charcoal is ground to regular dimensions and its volume calculated by direct measurement. It is "outgassed" and weighed in a vacuum. The mass divided by the volume of the granule gives the block density. The granule is then allowed to come to equilibrium with carbon tetrachloride vapor at 25° and the gain in weight (vapor taken up) determined. Having determined the real density of the charcoal (J. A. C. S. 42, 391—(1920)), the percent of the granule volume actually occupied by carbon may be calculated by dividing the block density by the real density and multiplying by 100. Subtracting the percentage of the granule volume occupied by the carbon from 100 gives the percentage void space in the granule. The useful void space can be calculated by dividing the weight of $CCl_4$ vapor adsorbed by the charcoal by the density of carbon tetrachloride. Dividing the useful void space by the total void space and multiplying by 100 gives the percent of the void space which can be used for taking up carbon tetrachloride under these conditions.

Even the best grades of activated coconut charcoal prepared by known processes show a useful pore volume of only fifty to seventy percent of the total pore volume of the granule and hence do not show as high an activity per unit volume as would be possible if the large pores did not exist.

If the carbonaceous material is both charred and activated by the hot activating gases ($H_2O$, $CO_2$ etc.) according to another known process, the situation is not improved and the charcoal, even when made from coconut shells, is not superior to that produced by the above two stage charring and activation process.

It has long been known that active charcoal can be prepared by carbonizing organic material which has first been impregnated with various chemical reagents such as $H_2SO_4$ and $ZnCl_2$, and more recently $H_3PO_4$ has come into use for this purpose. When these impregnating agents are used, the charcoal is active as soon as the charring is complete and the impregnating agent is removed. The charcoal is not subjected to oxidation activation and so the yield is very high, usually even higher than it would be if the carbonization has been carried out in the absence of an impregnating agent.

There is not, at present, to my knowledge, any method for predicting whether or not a given chemical substance will be suitable for causing the formation of a highly active charcoal when it is used as an impregnating agent, or any general classification which includes all of such materials. Of the three examples above given, all of which have acquired commercial importance, $H_2SO_4$ is an oxidizing acid, $H_3PO_4$ is an acid with very feeble oxidizing properties and $ZnCl_2$ is a neutral salt which is however used in a solution of hydrochloric acid. The use of sulfuric acid has been discontinued due to the fact that it is too active an oxidizing agent and attacks the charcoal at temperatures too low for efficient activation. These materials have the common property of attacking and more or less dissolving cellulosic material at comparatively low temperatures and destroying the original cell structure of the said material to a greater or less extent depending upon the conditions. When this dissolving action goes to completion, the charcoal produced may have a glassy looking fracture and the original cell structure of the starting material is not apparent in the charcoal, although it is shown in great clearness and detail in ordinary charcoal. Naturally, the appearance of the charcoal may be intermediate between that of ordinary charcoal and the glassy, structureless appearance resulting from very drastic treatment by an impregnating agent.

The charcoal, however, is frequently more friable than would be desirable and possesses a relatively feeble adsorptive force which is shown by a low retentivity and a low capacity for the more volatile materials. Although the original cell structure of the carbonaceous material used may be completely destroyed by the action of the impregnating agent during carbonization and the microscope shows substantially no pores visible at 100 diameters, the percentage useful pore volume is not greater with charcoal prepared by the first mentioned method. For example, a commercial phosphoric acid charcoal of French manufacture testing 43 minutes by the accelerated chloropicrin test shows a proportion of useful voids to total voids of less than forty percent. A 48 minute phosphoric acid charcoal of American manufacture shows a proportion of useful voids of about fifty percent. The 1918, 60 minute, German gas mask charcoal made by the zinc chloride process shows a proportion of useful voids of about fifty percent.

I have discovered that it is possible to prepare a charcoal of which substantially the entire void or pore space within the granule is useful for sorbing vapors. This charcoal therefore shows substantially the maximum activity per unit volume possible for charcoal of a given block density. The activity of charcoal per unit volume is such an important property that it is more used to express the value of adsorptive charcoal than any other. Commercial gas adsorptive charcoal is priced in the United States according to the "minutes" activity on the accelerated chloropicrin test, which is a volume test well known to the art. The test consists in passing air saturated at 0° C. with chloropicrin vapor, through a 10 centimeter layer of granular charcoal at the rate of 1000 c. c. per sq. in. cross section of charcoal at a temperature of 25° C. until the chloropicrin in the effluent air will give a distinct green coloration to a gas flame in which there is an incandescent copper wire. The time in minutes required for the chloropicrin to break through the charcoal is referred to as the activity of the charcoal. The reason for this emphasis upon the activity per unit volume rather than any other adsorptive property is that the size of absorber tanks, pressure drop, steam requirements etc. of a vapor recovery installation are governed largely by this property and hence it is the most important specification of the charcoal from a commercial standpoint.

In order that charcoal may show maximum activity per unit volume, it is necessary that gross pores should be substantially absent and hence I use an impregnating agent which destroys the original cell structure of the carbonaceous material such as for example, phosphoric acid. The resulting charcoal has a glassy, gel-like fracture and practically no pores are visible under a microscope at 100 diameters magnification. The charcoal is then subjected to a controlled partial oxidation with superheated steam, carbon dioxide or other activating agent known to the carbon art in order to increase its adsorptive power and the activation continued until the desired activity is reached. The longer the activation is continued, the higher the activity will be and the lower the yield. This is true at least to a block density of less than 0.5.

Charcoal may be produced in this way which tests substantially one hundred minutes on the accelerated chloropicrin test, although the processes of the prior art are claimed to give a maximum activity of only sixty seven minutes. The yields for a given activity of charcoal are from two to three times those obtained by activating a primary carbon and, due to the highly developed and uniform ultra porosity, even coconut charcoal can be made to show carbon tetrachloride saturation values at 25° C. of substantially 210% by weight.

*Example 1.*—Fragments of coconut shells are immersed in a 45% solution of $H_3PO_4$ until they are throughly wet by the acid. This may be ascertained by inspection of representative cross sections of the fragments or more certainly by examination of the resulting charcoal. An incompletely impregnated shell or seed yields, on charring, a charcoal only part of which gives a glassy fracture, the remainder fracturing in a manner approaching the fracture of ordinary charcoal. When thoroughly impregnated, the excess acid is drained from the shells and they are carbonized on a schedule of 50° C. per hour up to 950° C. The resulting charcoal is then ground to the desired mesh and treated with superheated steam at 850° C. until the desired activity is reached.

It is not necessary to extract the phosphoric acid from the charcoal with water (although this may be done if desired) as much of it is removed during the carbonization and the remainder is changed chemically by the combined action of the high temperature, steam, and charcoal so that it is removed from the charcoal with substantial completeness during the activation.

In activating the charcoal I may use trays, horizontal rotating cylinders or any other known method of activating charcoal by the action of a mild oxidizing agent.

*Example 2.*—Coconut shells are impregnated and charred as in Example (1), and subjected to the action of carbon dioxide at 930° C. In this case a trace of phosphorus usually remains in the charcoal but not enough to interfere seriously with its activity.

*Example 3.*—Broken peach seeds treated as in Examples (1) or (2) yield highly active charcoal but a longer time or smaller pieces are required for complete impregnation than is the case with coconut shells.

In cases where the starting material contains large quantities of moisture, it may be desirable to dry it in order to assist impregnation.

Although the above examples are given for clarity, I do not wish to be limited by them, as to starting materials, impregnating agent, oxidizing agent, temperatures, etc. The scope of the invention includes the charring of any carbonaceous material in the presence of an impregnating agent capable of causing to be formed under the conditions a charcoal substantially free from gross pores and the further treatment of this charcoal with mild oxidizing agents suitable for oxidation activation.

I claim as my invention:

1. A process for the manufacture of highly active gas adsorbent carbon which consists in impregnating carbonaceous material with phosphoric acid, then calcining said impregnated material in the absence of free oxygen, and submitting the calcined product to controlled partial oxidation at temperatures above 700° C.

2. A process for the manufacture of highly active gas adsorbent carbon which consists in calcining carbonaceous material impregnated with phosphoric acid in the absence of free oxygen, and subjecting the carbon so produced to controlled partial oxidation at a temperature above 700° C.

In testimony whereof I affix my signature.

HENRY BOHN HASS.